United States Patent [19]

Deboer

[11] Patent Number: 5,132,043

[45] Date of Patent: Jul. 21, 1992

[54] METHOD OF PREPARING SMALL PARTICLE SIZE BORATE PHOSPHOR

[75] Inventor: Barry G. Deboer, Georgetown, Mass.

[73] Assignee: GTE Products Corporation, Danvers, Mass.

[21] Appl. No.: 812,984

[22] Filed: Dec. 24, 1991

[51] Int. Cl.$^5$ .................... C09K 11/78; C09K 11/80
[52] U.S. Cl. .................... 252/301.4 R; 252/301.6 R
[58] Field of Search ................ 252/301.4 R, 301.6 R

[56] References Cited

U.S. PATENT DOCUMENTS

| | | | |
|---|---|---|---|
| 3,014,877 | 2/1961 | Ranby et al. | 252/301.4 R |
| 4,233,538 | 11/1980 | van de Spijker et al. | 252/301.4 R |
| 4,319,161 | 3/1982 | Looye et al. | 252/301.4 R |
| 4,422,007 | 12/1983 | Fouassier et al. | 252/301.4 R |
| 4,604,549 | 8/1986 | Matsuda et al. | 252/301.4 R |
| 4,883,970 | 11/1989 | Page | 252/301.4 R |
| 4,926,091 | 5/1990 | Verlijsdank et al. | 252/301.4 R |
| 5,023,015 | 6/1991 | Lagos | 252/301.4 R |
| 5,047,173 | 9/1991 | Kasenga et al. | 252/301.4 R |

FOREIGN PATENT DOCUMENTS

| | | | |
|---|---|---|---|
| 62-54786 | 3/1987 | Japan | 252/301.4 R |
| 2160884 | 1/1986 | United Kingdom | 252/301.4 R |

OTHER PUBLICATIONS

Saubat et al., "Synthesis and Structural Study of the New Rare Earth Magnesium Borates LnMbB$_5$O$_{10}$(Ln=La, ..., Er)", J. of Solid State Chemistry 34, 271–277 (1980).

de Hair et al., "New Tb$^{3+}$ and Mn$^{2+}$ Activated Phosphors and Their Application in 'Deluxe' Lamps", Third Intl. Symp. on the Science and Tech. of Light Sources, Toulouse, A pr., 1983.

H. J. Borchardt, "Efficiency of Eu$^{3+}$ Fluorescence in Oxygen-Dominated Host Lattices", J. Chem. Physics, 42:11, pp. 3743–3745, (1965).

A. Bril et al., "Fluorescent Properties of Some Europium-Activated Phosphors", J. Electrochemical Society, vol. 111, No. 12, pp. 1363–1368.

Frank J. Avella, "The Cathodluminescence of Terbium Activated Indium Orthoborate", EL & Photoresponse of Ta$_2$O$_5$ Diode, vol. 113, No. 11, p. 1225.

Avella et al., "Rare Earth Cathodoluminescence in InBO$_3$ and Related Orthoborates", J. Electrochem. Soc: Solid State Science, vol. 114, No. 6, pp. 613–616.

J. Th. W. de Hair, "The Intermediate Role of Gd$^{3+}$ in the Energy Transfer from a Sensitizer to an Activator", J. of Luminescence, 18/19 pp. 797–800 (1979).

J. Th. W. de Hair et al., "The Intermediate Role of Gd$^{3+}$ in the Energy Transfer from a Sensitizer to an Activator (Especially TB$^{3+}$)", J. Electrochem, Soc.: Solid-State Science & Tech., vol. 127, No. 1, pp. 161–164 (1980).

G. Blasse et al., "Study of Energy Transfer from Sb$^{3+}$, Bi$^{3+}$, Ce$^{3+}$ to Sm$^{3+}$, Eu$^{3+}$, Tb$^{3+}$, Dy$^{3+}$", J. Chem. Physics, vol. 47, No. 6, pp. 1920–1926 (1967).

Palumbo et al., "Electronic States of Mn$^{2+}$-Activated Phosphors", J. Electrochem. Soc.: Solid State Science, vol. 117, No. 9, pp. 1184–1188 (1970).

Abdullaev et al., "Crystal Structure of the Metaborates Sm(BO$_2$)$_3$ and Gd(BO$_2$)$_3$", Sov. Phys. Crystallogr., vol. 20, No. 2, pp. 161–163.

Primary Examiner—Jack Cooper
Attorney, Agent, or Firm—Robert F. Walter

[57] ABSTRACT

The present invention provides a process for the preparation of a small particle size borate lamp phosphor by preparing a dispersed suspension containing particles of a borate lamp phosphor precursor, adding a sufficient amount of boric acid to the dispersed suspension to provide for the mutual isolation of the borate lamp phosphor precursor particles in the boric acid, drying the mixture under conditions suitable for retaining the precursor as a dispersed phase in a matrix of boric acid, communicating the dried mixture, firing the comminuted mixture under conditions suitable for converting the precursor to a small particle size borate lamp phosphor product in a matrix of boric oxide while maintaining the mutual isolation of the product particles, and contacting the resulting mixture with water to solubilize substantially all of the boric oxide and separate the small particle size borate lamp phosphor product.

11 Claims, No Drawings

METHOD OF PREPARING SMALL PARTICLE SIZE BORATE PHOSPHOR

TECHNICAL FIELD

This invention relates to a process for the preparation of a small particle size borate lamp phosphor.

BACKGROUND OF INVENTION

One known family of luminescent materials, some of which are useful as lamp phosphors, are of the general formula: $(Ln_wGd_xCe_yTb_z)(M_aMn_b)(B_cAl_d)_5O_{10}$, where $w+x+y+z=a+b=c+d=1$, any of w, x, z, b, or d may be zero, Ln is Y or La, and M is Mg, Zn, or Cd. The preparation of various versions has been described in B. Saubat, M. Vlasse, and C. Fouassier, J. Solid State Chem., 34, 271–277 (1980); J. de Hair and J. Kemanade, Paper No. 54, Third International Symposium on the Science and Technology of Light Sources, Toulouse, Apr., 1983; B. Looye, J. de Hair, C. Bakker, U.S. Pat. No. 4,319,161, Mar., 1982; C. Fouassier and B. Saubat, U.S. Pat. No. 4,422,007, Dec. 1983; and elsewhere. The preparations are of two kinds; a solution of the metal nitrates and boric acid is evaporated (or boiled) to dryness, and the resulting solid fired; or the standard method ("shake and bake") is used, wherein boric acid and the metal oxides or oxide precursors (hydroxides, carbonates, nitrates, etc.) are intimately mixed as dry powders and the mixture fired. The firing step is sometimes repeated with intervening grinding and remixing.

The standard method can be made to produce a very nearly single-phase material of good brightness and stability in low pressure mercury vapor lamps. However, the particle sizes obtained are typically so large as to require the use of uneconomically large weights of phosphor per lamp. Attempts to grind the material to smaller particle sizes irreversibly degraded it. A method of initially forming the phosphor as small particles has been sought and found.

SUMMARY OF THE INVENTION

The present invention provides a process for the preparation of a small particle size borate lamp phosphor by preparing a dispersed suspension containing particles of a borate lamp phosphor precursor, adding a sufficient amount of boric acid to the dispersed suspension to provide for the mutual isolation of the borate lamp phosphor precursor particles in the boric acid, drying the mixture under conditions suitable for retaining the precursor as a dispersed phase in a matrix of boric acid, comminuting the dried mixture, firing the comminuted mixture at conditions suitable to convert the precursor to a small particle size borate lamp phosphor product in a matrix of boric oxide, while maintaining the mutual isolation of the product particles, and contacting the resulting mixture with water to solubilize substantially all of the boric oxide and separate the small particle size borate lamp phosphor product.

The resulting material desirably is single phase with good brightness and stability in low pressure mercury vapor lamps and advantagously may be used in economical weight.

DETAILED DESCRIPTION OF PREFERRED EMBODIMENTS

The borate lamp phosphor product compositions of the present invention preferably have the formula $(Ln)(M)(B_cAl_d)_5O_{10}$, where $c+d=1$. Ln is selected from yttrium, lanthanide rare earth elements, and mixtures thereof. Preferably Ln is Gd, Ce, Tb and mixtures thereof. M is selected from dipositive ions, preferably the Mg, Mn, Zn, or Cd dipositive ions. The subscript d is from 0 to about 0.25 since it is preferable that the final phosphor include some aluminum. The phosphor is formed from a precursor of the same formula which is prepared by mixing stoichiometric amounts of the ingredients as an aqueous solution, preferably of the nitrates. The preferable small particle size borate phosphors have the formula: $(Gd_x,Ce_y,Tb_z)(M_aMn_b)(B_cAl_d)_5O_{10}$ for which $x+y+z=a+b=c+d=1$, where the preferred constituents and amounts of constituents are as set forth in the previously described references, which formulas are incorporated by reference into the present specification.

The method consists of a sequence of steps which are outlined here, with some comments as to the reason for some of them.

1. Preferably the precursor is prepared by pouring a fairly concentrated solution of the metals as their nitrates plus the required amount of boric acid into another solution containing excess ammonium hydroxide, producing a slurry of fine precipitate.

2. The resulting aqueous mixture containing the co-precipitate is spray dried under conditions suitable for retaining substantially all of the ions and boric acid forming a spray dried coprecipitate comprising water and nitrogen containing compounds. Spray drying is desirable in order to capture all of the dipositive ion such as magnesium (or zinc) which has an appreciable solubility and would be partially lost by simply filtering off the precipitate.

3. Next, the spray-dried material is first-fired (at about 400° to 600° C.) to remove substantially all of the water and decompose the nitrogen containing compounds, principally $NH_4NO_3$, to form a substantially insoluble resulting precursor.

4. The resulting precursor is suspended in water and stirred in an ultrasonic cleaning bath to break up and disperse aggregates. Other dispersing methods known in the art may be utilized to produce similar results.

5. Then boric acid is added to the suspension in an amount sufficient to provide for the mutual isolation of the precursor particles and form a uniform mixture containing boric acid. Preferably, powdered boric acid is added to the dispersed suspension with continued stirring and operation of the ultrasonic bath, to and beyond the point of saturation of the water with boric acid. Typically, a weight of boric acid eight times the weight of the first-fired material is used, together with sufficient water to provide good mixing. The final $\frac{1}{4}$ to $\frac{2}{3}$rds of the boric acid may be mixed in by any convenient means. The purpose of dispersing the precursor in boric acid is to prevent the coalescence of the fine precursor particles as they convert to the phosphor by isolating them in a matrix of $B_2O_3$. The preferred 8:1 weight ratio gives an approximately 8:1 volume ratio of $B_2O_3$ to precursor or phosphor in the final firing; that is, on average, the precursor particles are separated by their own diameters.

6. The above slurry is dried under conditions which avoid the formation of large crystals of boric acid, preferably as rapidly as is feasible. According to a typical drying technique, the slurry is dried as a thin layer in a preheated heavy glass pan in a drying oven with the "mud" textured material being occasionally stirred.

"Frying" the slurry to dryness on a hot surface is another suitable technique. Better results are obtained if the dried cake is crushed to pass, for example, a 60 or 100 mesh sieve. Spray-drying this slurry does work, but part of the boric acid is vaporized and lost.

7. This dried mixture (boric acid plus fired, spray-dried precipitate) is second-fired to slowly convert the added boric acid to $B_2O_3$. Depending on the depth of the bed of material fired, two to eight or more hours at 450°, 500°, & up to 600° C. are needed for this dehydration, which, if done too quickly, gives a lower quality final product.

8. The dehydrated material is third-fired at about 900° C., typically for 2 hr., in a current of $N_2 + H_2$ (0.5 to 1% or more $H_2$) and cooled in the same atmosphere. This step converts the precursor to the final phosphor product. The material need not be cooled between 2nd & 3rd firings. The exact maximum temperature needed varies slightly with the exact phosphor composition. Too high a temperature gives large phosphor particles in spite of the presence of the $B_2O_3$ matrix. A preferred container material for this firing is a noble metal, refractory metal, or similar alloy. Alumina may also be used, but then the fired cake strongly adheres and must be dissolved out rather than being removed mechanically. Silica containers are destroyed by the mixing of their surfaces with the $B_2O_3$ to form a glass that shatters upon cooling. Nickel containers were used for most of the Examples, but invariably greyed the surfaces of the fired cake that were in contact with the metal.

9. The large excess of $B_2O_3$ is washed from the phosphor product with several changes of hot water. The phosphor may be collected by settling or centrifuging. Washing converts the $B_2O_3$ to $H_3BO_3$, all traces of which must be removed from the phosphor to avoid carrying destructive hydrogen into the mercury vapor arc tube. After drying, the phosphor is ready for use. The final small particle size borate lamp phosphor preferably has an average particle size of about 3 to about 8 microns.

The preferred concentrations in the various steps are as follows. The precipitation and spray drying steps work well with a total rare earths concentration of 0.2M, total dipositive metal ions concentration also 0.2M, and boric acid at 1.0M. The equal volume of $NH_4OH$ solution must contain enough base to give a final pH of about 10. The 2.0M actually used gives 100% excess base. Higher or lower concentrations also give satisfactory precursor, but these give the minimum volume to be spray dried that the particular spray drier used is able to process without excessive practical difficulties.

In the $H_3BO_3$ mixing step, the preferred concentrations are: for X grams precursor, 15 X ml hot water, and 8 X grams powdered boric acid. In the final firing, a reducing atmosphere is desired, but no differences were seen for hydrogen in nitrogen concentrations from about ½% to about 4%. Some means of premixing at least the rare earths on an atomic scale, such as the coprecipitation described, is believed to be necessary for the synthesis of small particles of this phosphor. The reason for so believing is as follows: The commercial high-purity rare earth oxides that would be used in the standard ("shake-and-bake") method are composed of particles of about 5 micron diameter. To form a typical composition of say, $Gd_{.6}Ce_{.2}Tb_{.2}$, one would have to assemble, by some hypothetical perfect powder-mixing technique, three Gd oxide particles plus one each of Ce and Tb, forming a cluster about 10 microns in diameter. Firing this in the presence of sufficient Mg and $B_2O_3$ would mix the rare earth components essentially by random diffusion only. Since there is little chemical difference between the rare earths to drive the mixing energetically, entropy effects dominate. Diffusion sufficient to mix a 10 micron volume to a reasonable degree of uniformity would have to have a transport range of at least 20 or more microns. This implies that the smallest particle we could hope to produce by the standard method is about 20 microns in diameter, compared to the ca. 5 microns that we require for reasons of lamp optics, powder weight and economy.

It was noticed that the $B_2O_3$-isolation firing method is in contradiction to the phase diagram published by Saubat, Vlasse, and Fouassier.

EXAMPLES

Example 1

The following materials were used:

| Material | amount | gram-atoms |
| --- | --- | --- |
| $Gd_2O_3$ | 11.33 g | .0625 |
| $Tb_4O_7$ | 3.27 g | .0175 |
| $Ce(NO_3)_3$ hydrate | 9.28 g* | .0200 |
| con. $HNO_3$ | 16.0 ml | .249 |
| 30% $H_2O_2$ | a few ml, as needed | |
| basic $MgCO_3$ | 8.57 g* | .0905 |
| $MnCO_3$ | 1.09 g* | .0095 |
| con. $HNO_3$ | 12.9 ml | .200 |
| $Al(NO_3)_3$ hydrate | 3.75 g* | .0100 |
| $H_3BO_3$ | 30.92 g | .5000 |
| con. $NH_4OH$ | 67.5 ml | 1.0 |

*Equivalent weights previously determined by firing to the oxides.

The $Gd_2O_3$ and $Tb_4O_7$ were dissolved in nitric acid with heating and with the aid of a few ml of 30% $H_2O_2$, which also decolorized the solution by reducing $Tb^{4+}$ to $Tb^{3+}$. In a separate container, the basic $MgCO_3$ and $MnCO_3$ were dissolved in nitric acid, diluted with a little water, and briefly boiled. The Gd and Tb solution, the $Ce(NO_3)_3$ and $Al(NO_3)_3$ hydrates, the Mg and Mn solution, and the boric acid were all combined with sufficient water to make 500 ml. This combination was stirred and warmed to about 55° C., below which temperature, solids begin to crystallize out. The $NH_4OH$ (100% excess) was diluted to 500 ml in another container, and stirred vigorously with a mechanical stirrer. The warm metals and borate solution was slowly added to the stirred base, giving a slurry of light brown precipitate. The slurry was found to have a pH of about 10. The slurry was immediately spray-dried using a Buchi Model 160 mini spray dryer equipped with a 0.5 mm nozzle. The inlet and outlet temperatures were typically about 210° and 68° C., and the liter of slurry was dried in 60 to 80 minutes. The spray-dried precipitate was fired in fused silica containers at 500° C. under flowing ½% hydrogen in nitrogen for two hours. Copious amounts of water vapor and nitrogen oxides were evolved. A sample of this precursor material was dispersed in water with an ultrasonic cleaning bath and found to have a mean particle diameter of 4.1 microns with 90% of the particles smaller than 8.2 microns, as measured by light-scattering in a Leeds & Northrup Microtrac particle size analyzer. For brevity, the latter measure will hereinafter be referred to as the "90th% diameter".

This precursor was dispersed in eight times its own weight of boric acid. Sixteen grams of precursor were dispersed in about 800 ml of deionized water by stirring on an operating ultrasonic cleaning bath. Then 128 g of powdered boric acid was gradually stirred in. The resulting thick slurry was dried in pans in a laboratory drying oven at about 105° C. The dried cake was crushed and passed through a 100 mesh sieve.

A portion of this material was fired, again in flowing ½% hydrogen in nitrogen, on a temperature schedule of 2 hr. at 500° C., 1 hr. at 600° C., and 2 hr. at 800° C. After washing as described below, a mean particle diameter of 6.1 microns and a 90th% diameter of 14.7 microns were found. Another portion, fired and washed in the same manner except that the last temperature step was at 900° C., gave a mean particle diameter of 5.4 microns and a 90th% diameter of 14.6 microns. A third portion fired similarly up to a maximum temperature of 1000° C. and washed gave a mean particle diameter of about 15 microns and a 90th% diameter of about 30 microns.

In all Examples, the washing procedure consisted of stirring the fired material in deionized water on a heating plate until the water boiled, allowing the mixture to stand, cool and settle, and decanting off the clear supernate. These steps were performed three, or in some Examples, four, times before the phosphor powder was dried in the drying oven. In this and all other Examples, the final phosphor was checked by (at least) visual inspection under an ultraviolet light source and by powder X-ray diffraction. The latter showed the desired phase mixed with zero to a few percent of the rare earth metaborate, $(Ln)B_3O_6$, in all Examples.

Example 2

The following materials were used:

| Material | amount | gram-atoms |
|---|---|---|
| $Gd_2O_3$ | 11.33 g | .0625 |
| $Tb_4O_7$ | 3.27 g | .0175 |
| $Ce(NO_3)_3$ hydrate | 9.28 g* | .0200 |
| con. $HNO_3$ | 16.0 ml | .249 |
| 30% $H_2O_2$ | a few ml, as needed | |
| basic $MgCO_3$ | 8.57 g* | .0905 |
| $MnCO_3$ | 1.09 g* | .0095 |
| con. $HNO_3$ | 12.9 ml | .200 |
| $H_3BO_3$ | 30.92 g | .5000 |
| con. $NH_4OH$ | 67.5 ml | 1.0 |

*Equivalent weights previously determined by firing to the oxides.

The materials were dissolved, precipitated, and spray-dried exactly as in Example 1, except for the omission of aluminum nitrate. The spray-dried precipitate was fired at 500° C. under flowing nitrogen for two hours, evolving water vapor and nitrogen oxide. A sample of this precursor material was dispersed in water using an ultrasonic cleaning bath and found to have a mean particle diameter of 4.3 microns and a 90th% diameter of 9.7 microns. Several replications of this preparation gave mean particle diameters in the range from 5.3 to 3.9 microns and 90th% diameters from 11.5 to 8.5 microns. Using the combined product of several replicate preparations, 106.5 g of precursor was dispersed in about 700 ml of deionized water by stirring for 30 min. in an ultrasonic cleaning bath. While still stirring on the ultrasonic bath, 350 g of powdered boric acid was added. An additional 500 g of powdered boric acid was placed in a one gallon ball mill with alumina balls, and the slurry added. The mill was rolled briefly, reopened and sufficient water added to give good mixing, and rolled again for about one hour. The mill charge was separated from the mill balls and dried in a laboratory drying oven at about 105° C. This was repeated several times, and the products combined.

The dried chunks were coarsely crushed and a sample fired in flowing 1% $H_2$ in $N_2$ on a schedule of 2 hr. at 500° C., 1 hr. at 600° C., and 2 hr. at 900° C. The fired cake had a bottom layer of transparent glassy $B_2O_3$ and after washing, the phosphor had a mean particle diameter of 30 microns or larger. When the dried chunks were first ground to pass a 100 mesh sieve, and then fired and washed in the same manner, very little glassy bottom was found and phosphor with a mean particle diameter of 5.0 microns and 90th% diameter of 18.6 microns was obtained.

Example 3

The same materials, in the same amounts, were dissolved, precipitated, and spray-dried exactly as in Example 2.

A portion of the spray-dried precipitate was fired in air, and the remainder in flowing ½% hydrogen in nitrogen, each at 500° C. for two hours. No difference was noted in the appearance or texture of the fired material, and both samples were found to have mean particle diameters of 4.0 microns. Their 90th% diameters were 8.6 and 9.0 microns, respectively. Three 2.5 g portions of the $H_2/N_2$-fired precursor were dispersed by stirring on the ultrasonic cleaning bath in 15, 15, and 25 ml of deionized water and 5, 10, and 20 g, respectively, of powdered boric acid gradually stirred in. Each of these slurries was rapidly dried by "frying" them, with continuous stirring, in a shallow heat-resistant glass Pyrex dish heated well above the boiling point of water on a laboratory hot plate. These were then fired for 2 hr. at 500° C., 1 hr. at 600° C., and 2 hr. at 900° C. in flowing nitrogen. After washing, the mean particle diameters resulting from dispersing the precursor in twice, four times, and eight times its own weight of boric acid were 8.9, 5.9, and 3.3 microns, respectively. The corresponding 90th% diameters were 18.8, 13.1, and 8.5 microns.

An 8 g portion of the air-fired precursor, above, was dispersed, as described, in 100 ml of deionized water and this mixture was poured into a slurry of 32 g of boric acid in 400 ml water. The mixture was stirred on the ultrasonic bath for an additional one-half hour, made up to about 550 ml with additional water to reduce the slurry viscosity, and spray dried under approximately the same conditions as used for the precipitate. Firing and washing as in the preceding paragraph gave mean particle diameter of 11.1 microns and a 90th% diameter of about 23 microns.

Example 4

The same materials, in the same amounts, were dissolved, precipitated, and spray-dried exactly as in Example 2. The spray-dried precipitate was fired in flowing nitrogen at 500° C. for two hours and then at 600° C. for 1 hr. This precursor was found to have a mean particle diameter of 4.3 microns and a 90th% diameter of 9.5 microns.

A 20 g portion of this precursor was dispersed in 200 ml of warm (40° to 45° C.) deionized water by stirring in the ultrasonic cleaner, 160 g of powdered boric acid was gradually added with continued stirring in the ultrasonic cleaner. The resulting slurry was poured into a preheated thick glass tray in a laboratory drying oven and dried at about 105° C. with occasional stirring. The dried material was crushed and passed through a 100 mesh sieve. A second, 10 g, portion of the precursor was dispersed in the same manner in 400 ml of warm water and 22.5 g of powdered boric acid added. The slurry was brought up to about 600 ml total volume to allow good mixing, and then dried and sieved in the same manner as the first portion.

Both the portion dispersed in eight times its weight of boric acid, and the one in 22.5 times, were fired in flowing ½% hydrogen in nitrogen using a heating schedule that took 7.5 hours to reach the maximum temperature of 880° C. The maximum temperature was maintained for two hours and the furnace shut off. After washing, the "8-times" and "22.5-times" samples gave mean particle diameters of 4.7 and 10.0 microns, and 90th% diameters of 9.7 and 21.5 microns, respectively.

Other samples of the "8-times" portion gave mean and 90th% diameters of 6.4 and 15.0 microns when fired to an 880° C. maximum temperature, but 9.4 and 19.0 microns at 900° C., using the same heating schedule.

Example 5

The following materials were used:

| Material | amount | gram-atoms |
|---|---|---|
| $Gd_2O_3$ | 22.66 g | .125 |
| $Tb_4O_7$ | 6.54 g | .035 |
| $Ce(NO_3)_3$ hydrate | 18.57 g* | .040 |
| con. $HNO_3$ | 32.0 ml | .4975 |
| 30% $H_2O_2$ | a few ml, as needed | |
| basic $MgCO_3$ | 17.93 g* | .190 (5% excess) |
| $MnCO_3$ | 2.30 g* | .020 |
| con. $HNO_3$ | 26.4 ml | .410 |
| $H_3BO_3$ | 68.02 g | 1.10 (10% excess) |
| con. $NH_4OH$ | 112.0 ml | 1.65 |

*Equivalent weights previously determined by firing to the oxides.

These materials were dissolved, precipitated, and spray dried as in Example 2, except that the metals and boric acid solution was made up to 1200 ml (i.e. 0.6 of the concentration of Ex. 2) at about 35° C., and the initial volume of base was 2000 ml (about 0.4 of the concentration of Ex. 2).

The spray-dried precipitate was fired in flowing nitrogen containing about 0.2% hydrogen at 500° C. for two hours. This precursor was found to have a mean particle diameter of 4.3 microns and a 90th% diameter of 10.1 microns.

Example 6

The following materials were used:

| Material | amount | gram-atoms |
|---|---|---|
| $Gd_2O_3$ | 11.33 g | .0625 |
| $Tb_4O_7$ | 3.27 g | .0175 |
| $Ce(NO_3)_3$ hydrate | 9.28 g* | .0200 |
| con. $HNO_3$ | 16.0 ml | .249 |
| 30% $H_2O_2$ | a few ml, as needed | |
| basic $MgCO_3$ | 8.57 g* | .0905 |
| $MnCO_3$ | 1.09 g* | .0095 |
| con. $HNO_3$ | 12.9 ml | .200 |
| $H_3BO_3$ | 30.92 g | .5000 |
| con. $NH_4OH$ | 67.5 ml | 1.0 |

*Equivalent weights previously determined by firing to the oxides.

These materials were dissolved and precipitated as in Example 2, except that the volume of the metals and boric acid solution was restricted to 200 ml (five times the concentration of Ex. 2) at about 100° to 105° C., and the initial volume of base was only 100 ml (also five times the concentration of Ex. 2). The precipitate slurry was too thick to be processed by the spray dryer. A portion of it was diluted with deionized water by a factor of about 2.5, stirred in the ultrasonic cleaner for about 1 hr. and then spray dried as in the preceding Examples. The spray-dried precipitate was fired in flowing nitrogen at 500° C. for two hours. This precursor was found to have a mean particle diameter of 4.5 microns and a 90th% diameter of 9.6 microns.

Example 7

The following materials were used:

| Material | amount | gram-atoms |
|---|---|---|
| $Gd_2O_3$ | 10.87 g | .060 |
| $Tb_4O_7$ | 3.74 g | .020 |
| $Ce(NO_3)_3$ hydrate | 9.28 g* | .020 |
| con. $HNO_3$ | 16.1 ml | .250 |
| 30% $H_2O_2$ | a few ml, as needed | |
| basic $MgCO_3$ | 9.47 g* | .100 |
| con. $HNO_3$ | 12.9 ml | .200 |
| $H_3BO_3$ | 30.92 g | .5000 |
| con. $NH_4OH$ | 67.5 ml | 1.0 |

*Equivalent weights previously determined by firing to the oxides.

The materials were dissolved, precipitated, and spray-dried as in Example 2, except for the omission of the manganese.

The spray-dried precipitate was fired as in Ex. 2. The resulting precursor was found to have a mean diameter of 4.5 microns and a 90th% diameter of 9.4 microns.

An 8.18 g portion of this precursor was dispersed in eight times its own weight of boric acid, as in Ex. 1.

A portion of this, fired as in Ex. 4 with a maximum temperature of 880° C., gave mean and 90th% diameters of 15.7 and about 30 microns. Another portion, fired in the same manner, but with an 850° C. maximum temperature, gave values of 12.5 and about 25 microns.

Example 8

The following materials were used:

| Material | amount | gram-atoms |
|---|---|---|
| $Gd_2O_3$ | 14.50 g | .080 |
| $Ce(NO_3)_3$ hydrate | 9.28 g* | .020 |
| con. $HNO_3$ | 15.4 ml | .240 |
| 30% $H_2O_2$ | a few ml, as needed | |
| basic $MgCO_3$ | 7.57 g* | .080 |
| $MnCO_3$ | 2.30 g* | .020 |
| con. $HNO_3$ | 12.9 ml | .200 |
| $H_3BO_3$ | 30.92 g | .5000 |
| con. $NH_4OH$ | 67.5 ml | 1.0 |

*Equivalent weights previously determined by firing to the oxides.

The materials were dissolved, precipitated, and spray-dried as in Example 2, except for the omission of the terbium. The spray-dried precipitate was fired as in Ex. 2. The resulting precursor was found to have a mean diameter of 4.2 microns and a 90th% diameter of about 9 microns.

A 10.0 g portion of this precursor was dispersed in eight times its own weight of boric acid, as in Ex. 1. A portion of this, fired as in Ex. 4 with a maximum temperature of 880° C., gave mean and 90th% diameters of 7.6 and about 16.4 microns.

Example 9

The following materials were used:

| Material | amount | gram-atoms |
| --- | --- | --- |
| $Gd_2O_3$ | 14.50 g | .080 |
| $Ce(NO_3)_3$ hydrate | 9.28 g* | .020 |
| con. $HNO_3$ | 15.4 ml | .240 |
| 30% $H_2O_2$ | a few ml, as needed | |
| ZnO | 6.51 g* | .080 |
| $MnCO_3$ | 2.30 | .020 |
| con. $HNO_3$ | 12.9 ml | .200 |
| $H_3BO_3$ | 30.92 g | .5000 |
| con. $NH_4OH$ | 67.5 ml | 1.0 |

*Equivalent weights previously determined by firing to the oxides.

The materials were dissolved, precipitated, and spray-dried as in Example 2, except for the substitution of zinc for magnesium.

The spray-dried precipitate was fired as in Ex. 2. The resulting precursor was found to have a mean diameter of 4.4 microns and a 90th% diameter of 9.8 microns. A 10.0 g portion of this precursor was dispersed in eight times its own weight of boric acid, as in Ex. 1.

A portion of this, fired as in Ex. 4 with a maximum temperature of 880° C., gave mean and 90th% diameters of 6.1 and 13.9 microns.

What is claimed is:

1. A process for the preparation of a small particle size borate lamp phosphor having the formula $(Ln)(M)(B_cAl_d)_5O_{10}$, where $c+d=1$; Ln is selected from yttrium, the lanthanide rare earth elements, and mixtures thereof; M is selected from the group consisting of Mg, Mn, Zn, Cd and mixtures thereof, and d is from 0 to about 0.25, comprising the steps of:

coprecipitating a borate lamp phosphor precursor by mixing an aqueous boric acid solution comprising soluble salts of Ln, M, and Al with an aqueous solution of ammonium hydroxide to produce an aqueous slurry of said borate phosphor precursor as a coprecipitate;

spray drying said coprecipitate so that substantially all of metal ions and borate are retained in said coprecipitate to form a spray dried coprecipitate;

prefiring said coprecipitate at a temperature of about 400 to about 600 degrees Centigrade to form a substantially water insoluble precursor;

dispersing said substantially insoluble precursor in water to form an aqueous suspension of dispersed particles of a substantially water insoluble precursor;

adding a sufficient amount of boric acid to said aqueous suspension to provide for the mutual isolation of said particles of said substantially water insoluble precursor in the boric acid;

drying said resulting mixture of said substantially water insoluble precursor particles and said boric acid to retain said precursor particles as a dispersed phase in a matrix of boric acid;

comminuting said dried mixture;

firing said dried and comminuted mixture to convert said substantially water insoluble precursor particles to a small particle size borate lamp phosphor product in a matrix of boric oxide; and contacting said fired mixture of small particle size borate lamp phosphor product with water to solubilize substantially all of said boric oxide and separate small particles of borate lamp phosphor product.

2. A process for the preparation of a small particle size borate lamp phosphor in accordance with claim 1 wherein Ln is selected from the group consisting of Gd, Ce, Tb and mixtures thereof.

3. A process for the preparation of a small particle size borate lamp phosphor in accordance with claim 1 wherein the aqueous suspension is formed by ultrasonically dispersing said substantially water insoluble precursor.

4. A process for the preparation of a small particle size borate lamp phosphor in accordance with claim 1 wherein boric acid is added to said precursor suspension in a weight ratio of boric acid to said precursor of about 8 to 1.

5. A process for the preparation of a small particle size borate lamp phosphor in accordance with claim 1 wherein said firing comprises heating said dried and substantially uniform boric acid mixture at a temperature of about 800 to about 1000 degrees Centigrade in an atmosphere comprising nitrogen and hydrogen.

6. A process for the preparation of a small particle size borate lamp phosphor in accordance with claim 5 wherein said firing comprises a prior first heating, said first heating being at a temperature of about 450 to about 600 degrees Centigrade.

7. A process for the preparation of a small particle size borate lamp phosphor in accordance with claim 1 wherein said aqueous boric acid solution has a concentration of Ln ions of about 0.2 Molar.

8. A process for the preparation of a small particle size borate lamp phosphor in accordance with claim 1 wherein said aqueous boric acid solution has a concentration of $M^{2+}$ ions of about 0.2 Molar.

9. A process for the preparation of a small particle size borate lamp phosphor in accordance with claim 1 wherein said aqueous boric acid solution comprises boric acid at a concentration of about 1.0 Molar.

10. A process for the preparation of a small particle size borate lamp phosphor in accordance with claim 1 wherein the coprecipitation to produce an aqueous slurry of a coprecipitate comprises forming said slurry at a pH of about 10.

11. A process for the preparation of a small particle size borate lamp phosphor in accordance with claim 1 wherein said product has an average particle size of about 3 to about 8 microns.

* * * * *